United States Patent Office 3,578,699
Patented May 11, 1971

3,578,699
p-(1,5-DIMETHYL - 1,5 DIHALOHEXYL) BENZOIC ACID ESTERS, COMPOUNDS FOR COMBATTING INSECT PESTS OF THE GENUS DYSDERCUS
Frantisek Sorm and Milos Suchy, Prague, Czechoslovakia, assignors to Ceskoslovenska Akademie Ved, Prague, Czechoslovakia
Filed June 20, 1968, Ser. No. 738,397
Claims priority, application Czechoslovakia,
June 21, 1967, 4,548/67
Int. Cl. C07c 69/76; A01n 9/24
U.S. Cl. 260—476                                                 5 Claims

ABSTRACT OF THE DISCLOSURE

Insect pests of the genus Dysdercus are combatted by contacting insects, larvae or eggs of the genus Dysdercus with an effective amount of a compound of the formula

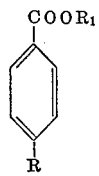

wherein R is 1,5-dimethyl-1,5-dihalohexyl wherein dihalohexyl is dichlorohexyl or dibromohexyl and $R_1$ is alkyl with one or two carbon atoms or an aralkyl with up to 9 carbon atoms. The above compound is produced by reacting a compound of the formula

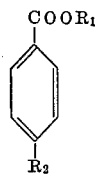

wherein $R_1$ is an alkyl group with one or two carbon atoms or an aralkyl group with up to 9 carbon atoms, and $R_2$ is a 1,5-dimethylhexa-1,4-dienyl group, with a hydrogen halide selected from the group consisting of HCl and HBr, and recovering the thus-produced compound.

BACKGROUND OF THE INVENTION

The present invention relates to novel dichloro and dibromo derivatives of p-(1,5-dimethyl-1,4-hexadienyl) benzoic acid, a method of making these compounds, and the use of these compounds for combatting insect pests of the genus Dysdercus.

The effect of the compounds of the present invention on the genus Dysdercus is similar to that of insect juvenile hormones which regulate the metamorphosis and reproduction. Similar effects were found in lipidic extracts of insects and some plants, as well as in the case of some farnesol derivatives, especially farnesylic acid methyl ester dihydrochloride. Also, juvabione and dehydrojuvabione which were isolated from extracts of Abies balsamea show juvenile hormone activity. All of these active compounds previously described have an aliphatic or alicyclic chain in their molecule.

SUMMARY OF THE INVENTION

According to the present invention, insect pests of the genus Dysdercus are combatted by contacting insects, larvae or eggs with an effective amount of the compound described below. Such contacting may be carried out by spraying a solution of the compound onto a Dysdercus-infested area.

The compound which is used according to the present invention for combatting Dysdercus pests has the formula

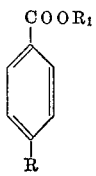

wherein R is 1,5-dimethyl-1,5-dihalohexyl wherein dihalohexyl is dichlorohexyl or dibromohexyl and $R_1$ is alkyl with one or two carbon atoms or an aralkyl with up to 9 carbon atoms, and may be produced by reacting a compound of the formula

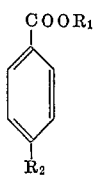

wherein $R_1$ is an alkyl group with one or two carbon atoms or an aralkyl group with up to 9 carbon atoms, and $R_2$ is a 1,5-dimethylhexa-1,4-dienyl group, with a hydrogen halide selected from the group consisting of HCl and HBr; and recovering the thus-produced compound of the formula

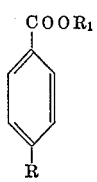

wherein $R_1$ has the same meaning as above, and R is a 1,5-dimethyl-1,5-dihalohexyl group wherein dihalohexyl is dichlorohexyl or dibromohexyl.

Preferably, the reacting is carired out either in an alcoholic medium, for instance in methanol, or in glacial acetic acid, and at a temperature between about 0 and 15° C.

Useful compounds of the present invention include the methyl and benzyl esters of p-(1,5-dimethyl-1,5-dichlorohexyl) benzoic acid and p-(1,5-dimethyl-1,5-dibromohexyl)benzoic acid.

DESCRIPTION OF THE PREFERRED EMBODIMENTS

The present invention relates to new compounds, a process of preparing the same and the use of these compounds for destroying insects by their non-toxic, physiological effects, the principle of which is to cause a developmental disturbance.

Specific insects, particularly those of the genus Dysdercus, are thereby prevented from metamorphosing into adults. The treated insects are unable to develop into sexually mature adults and are unable to reproduce.

Furthermore, the compounds of the present invention act as ovicides. In contact with body surface of adult females or eggs, they cause serious disturbances in the embryonic development, so that the larvae never hatch out of the treated eggs.

The compounds of the present invention easily penetrate uninjured insect integument and are highly active upon contact application. Therefore, all kinds of sprays, aerosols, etc., which will cause distribution of the compounds over the surface of the background, plants or insects themselves may be applied. Insect larvae or adults may be contaminated directly or indirectly through the soil or hosed plants.

The compounds of the present invention are specific pesticides against the red cotton-staining bugs of the genus Dysdercus which are serious pests of cotton. The compounds are also active against other members of the family Pyrrhocoridae, some of which are insect pests in Asia. On the other hand, the compounds of the present invention are completely inactive with respect to parasites and predators of other insect groups such as Coleoptera, Diptera, Hymenoptera, and Lepidoptera.

The compounds of the present invention have been found highly effective on larvae of the last instart of *Neodysdercus intermedius* Dist., Dysdercus discolor, *D. chaquensis, D. voelkeri,* and *D. cingulatus* (koenigii). Minimal effective doses which causes developmental disturbances are for most species 0.01 microgram per larva upon contact application.

In practical field tests against cotton stainers of Dysdercus, spraying or application of an aerosol to the fields which will suffice to cause contact of individual larvae with as little as 0.01 microgram of the compound is of the desired maximum efficiency. Thus, about 100 grams of the effective compound applied to 10,000 m.$^2$ will generally suffice to prevent all Dysdercus larvae from attaining sexual maturity and becoming reproducing adults, without any effect on the other insect populations.

The compound of the present invention are dichloro and dibromo derivatives of p-(1,5-dimethyl-1,4-hexadienyl) benzoic acid of the general formula

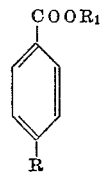

(I)

wherein R is the 1,5-dimethyl-1,5-dihalohexyl residue and R$_1$ is an alkyl group with 1 or 2 carbon atoms, or, an aralykl group with up to 9 carbon atoms.

According to the present invention, the process of preparing novel dichloro and dibdomo derivatives of p-(1,5-dimethyl-1,4-hexadienyl) benzoic acid of the above general Formula I consists in reacting compounds of the general Formula II

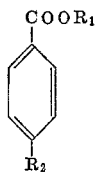

(II)

wherein R$_1$ has the same meaning as in Formula I and R$_2$ represents the 1,5-dimethyl-1,4-hexadienyl residue, with a dry hydrogen halide of the genedal Formula III

HX (III)

wherein X designates a chlorine or bromine atom. The reaction is preferably carried out in alcoholic medium or in glacial acetic acid at a temperature within the range from 0° C. to 15° C., preferably at 0° C., and the resulting compounds are isolated as described in Examples I and II below.

The process of the present invention may be illustrated by the following reaction scheme:

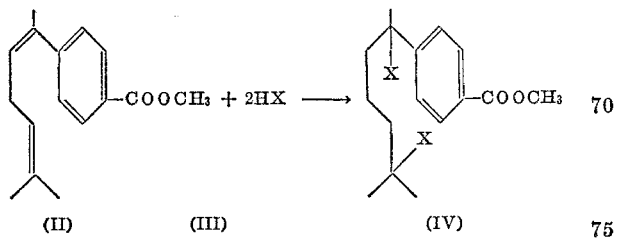

(II)          (III)          (IV)

The following examples are given as illustrative only, without limiting the invention to the specific details thereof.

EXAMPLE I

Preparation of p-(1,5-dimethyl-1,5-dichlorohexyl) benzoic acid ethyl ester of the general formula

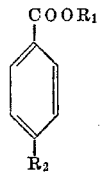

wherein R$_1$ designates the methyl group and R$_2$ represents the 1,5-dimethyl-1,5-dichlorohexyl group.

Dry gaseous hydrogen chloride is introduced at 0° C. into a solution of p-(1,5-dimethylhexa-1,4-dienyl) benzoic acid methyl ester (200 mg.) in methanol (5 ml.) until the solution is saturated. The solution is allowed to stand at room temperature for 2 hours and is then evaporated under diminished pressure (bath temperature 30° C.) to remove the solvent and excess hydrogen chloride. The residue is diluted with ice water (20 ml.) and extracted with three 16 ml. portions of light petroleum (B.P. 40–60° C.). The extracts are combined, washed with aqueous sodium hydrogen carbonate, dried over sodium sulfate, and evaporated at ordinary pressure. The residual solvent is removed at 30 mm. Hg. The residue, p-(1,5-dimethyl-1,5-dichlorohexyl)benzoic acid methyl ested, is a viscous liquid which is dried at 30° C. (12 mm. Hg) to remove the last traces of the solvent. Yield: 73%. For C$_{16}$H$_{22}$O$_2$Cl$_2$ (316) calculated: 22.1% Cl. Found: 19.25% Cl.

EXAMPLE II

Preparation of p-(1,5-dimethyl-1,5-dibromohexyl) benzoic acid methyl ester of the general formula

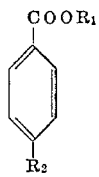

wherein R$_1$ designates the methyl group and R$_2$ represents the 1,5-dimethyl-1,5-dibromohexyl residue.

p-(1,4-dimethylhexa-1,4-dienyl) benzoic acid methyl ester (200 mg.) is added to an approximately 45% solution of hydrogen bromide in glacial acetic acid (1 ml.), the mixture is allowed to stand at room temperature for 15 minutes, and is then evaporated under diminished pressure (bath temperature 30° C.) to remove the solvent and excess hydrogen bromide. The residue is dissolved in ether (30 ml.). The ethereal solution is washed with aqueous sodium hydrogen carbonate, dried over sodium sulfate, and evaporated at 30 mm. Hg. The residual p-(1,5-dimethyl-1,5-dibromohexyl) benzoic acid methyl ester is a viscous liquid which is dried at 30° C. (12 mm. Hg) to remove the last traces of the solvent. Yield: 69%. For C$_{16}$H$_{22}$O$_2$Br$_2$ (404) calculated: 39.5% Br. Found: 37.9% Br.

EXAMPLE III

Preparation of p-(1,5-dimethyl - 1,5 - dichlorohexyl) benzoic acid benzyl ester of the general formula (IV)

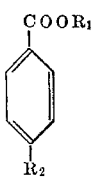

wherein R$_1$ designates a benzyl group and R$_2$ represents a 1,5-dimethyl-1,5-dichlorohexyl residue.

Dry gaseous hydrogen chloride is introduced at 0° C. into a solution of p-(1,5-dimethylhexa-1,4-dietnyl)benzoic acid benzyl ester (200 mg.) in methanol (5 ml.) until the solution is saturated. The solution is allowed to stand at room temperature for 15 minutes and evaporated under diminished pressure (bath temperature 30° C.) to remove the solvent and excess hydrogen chloride. The residue is diluted with iced water (20 ml.) and extracted with three 15 ml. portions of light petroleum (B.P. 40–60° C.). The extracts are combined, washed with aqueous sodium hydrogen carbonate, dried over sodium sulfate, and evaporated under ordinary pressure. The residual viscous liquid represents the desired p-(1,5-dimethyl-1,5-dichlorohexyl) benzoic acid benxyl ester which is dried at 30° C. (12 mm. Hg) for one hour to remove the last traces of the solvent. For $C_{22}H_{26}O_2Cl_2$ (39%) calculated: 17.8% Cl. Found: 16.2% Cl. The product was obtained in a 65% yield.

The physiological activity of the above compounds was tested on larvae of last instars of *Pyrrhocoris apterus* L. and *Dysdercus intermedius* and compared with that of some known compounds of the juvenile hormone type activity. The high activity of the novel compounds may be seen from the following table:

PHYSIOLOGICAL EFFECTS OF THE COMPOUNDS OF THE PRESENT INVENTION COMPARED WITH JUVENILE HORMONE TYPE ACTIVITY OF KNOWN COMPOUNDS

Effects on *Pyrrhocoris apterus* L.

| μg. per insect | Physiological effects expressed in units from 0 to 5 of the metamorphosis processes inhibition in larvae | | | | |
|---|---|---|---|---|---|
| | 0.01 | 0.1 | 1 | 10 | 100 |
| Farnesol | 0 | 0 | 0 | 0 | 1 |
| Farnesyl methyl ether | 0 | 0 | 0 | 1 | 2–3 |
| p-(1,5-dimethyl-1,5-dichlorohexyl)benzoic acid methyl ester | 0 | 2 | 5 | 5 | 5 |
| p-(1,5-dimethyl-1,5-dibromohexyl)benzoic acid meth l ester | 0 | 1 | 4 | 5 | 5 |

Effects on *Dysdercus intermedius*

| | | | | | |
|---|---|---|---|---|---|
| Farnesol | 0 | 0 | 0 | 0 | 1 |
| Farnesyl methyl ether | 0 | 0 | 0 | 0 | |
| p-(1,5-dimethyl-1,5-dichlorohexyl)benzoic acid methyl ester | 1 | 5 | 5 | 5 | 5 |
| p-(1,5-dimethyl-1,5-dibromohexyl)benzoic acid methyl ester | 0 | 4 | 5 | 5 | 5 |

The comparison tests were carried out by surface application of acetone solutions of the respective compounds By means of a microdosing device, a drop of the constant volume of 1μl. of the acetone solution of the corresponding amount of the compound tested was applied on the intact body surface. The juvenile hormone activity was determined according to the degree of inhibition of the metamorphosis differentiation processes. Zero activity designates the normal metamorphosis, units from 1 to 4 represent a partial activity, and unit 5 expresses the maximum activity characterized by the formation of complete extra-larvae.

In the case of *Pyrrhocoris apterus*, p-(1,5-dimethyl-1,5-dichlorohexyl)benzoic acid methyl ester shows the activity 2 when the dose is 0.1 μg. per insect and the maximum activity 5 is observed with a dose of 1 μg. per insect. In the case of the cotton insect *Dysdercus intermedius*, p-(1,5-dimethyl-1,5-dichlorohexyl)benzoic acid methyl ester shows the maximum activity 5 even in doses as low as 0.01 μg. per insect and therefore appears to be the most efficient compound known up to now for influencing the evolution of this insect.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A compound of the formula

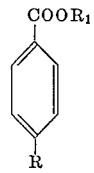

wherein R is 1,5-dimethyl-1,5-dihalohexyl wherein-dihalohexyl is dichlorohexyl or dibromohexyl and $R_1$ is alkyl with one or two carbon atoms or an aralkyl with up to 9 carbon atoms.

2. A compound as defined in claim 1, and selected from the group consisting of the methyl and benzyl esters of p-(1,5-dimethyl-1,5-dichlorohexyl) benzoic acid and p-(1,5-dimethyl-1,5-dibromohexyl)benzoic acid.

3. A compound as defined in claim 1, said compound being p-(1,5-dimethyl-1,5-dichlorohexyl) benzoic acid methyl ester.

4. A compound as defined in claim 1, said compound being p-(1,5-dimethyl-1,5-dibromohexyl) benzoic acid methyl ester.

5. A compound as defined in claim 1, said compound being p-(1,5-dimethyl - 1,5 - dichlorohexyl)benzoic acid benzyl ester.

References Cited

Reactions of Organic Compounds, Hickinbottom, 1948, pp. 24–25.

LEWIS GOTTS, Primary Examiner

J. L. DAVISON, Assistant Examiner

U.S. Cl. X.R.
424—308